United States Patent
Schelstraete

(10) Patent No.: US 8,588,052 B1
(45) Date of Patent: Nov. 19, 2013

(54) METHOD AND APPARATUS FOR DMT NETWORK DATA TRANSFER

(75) Inventor: Sigurd Schelstraete, Menlo Park, CA (US)

(73) Assignee: Ikanos Communications, Inc., Fremont, CA (US)

( * ) Notice: Subject to any disclaimer, the term of this patent is extended or adjusted under 35 U.S.C. 154(b) by 721 days.

(21) Appl. No.: 12/587,448

(22) Filed: Oct. 6, 2009

Related U.S. Application Data

(60) Provisional application No. 61/103,201, filed on Oct. 6, 2008.

(51) Int. Cl.
*H04J 11/00* (2006.01)

(52) U.S. Cl.
USPC ............ 370/203; 370/392; 370/478; 375/354

(58) Field of Classification Search
None
See application file for complete search history.

(56) References Cited

U.S. PATENT DOCUMENTS

| | | | | |
|---|---|---|---|---|
| 6,130,894 | A * | 10/2000 | Ojard et al. ................... | 370/421 |
| 7,881,362 | B2 * | 2/2011 | Shridhar et al. .............. | 375/219 |
| 7,898,972 | B2 * | 3/2011 | Huang et al. ................. | 370/252 |
| 8,189,457 | B2 * | 5/2012 | Hutchinson et al. .......... | 370/210 |
| 2005/0276347 | A1 * | 12/2005 | Mujtaba et al. ............... | 375/299 |
| 2005/0281316 | A1 * | 12/2005 | Jang et al. ..................... | 375/130 |
| 2006/0023749 | A1 * | 2/2006 | Yoshizawa et al. ........... | 370/470 |
| 2006/0035654 | A1 * | 2/2006 | Lee et al. ...................... | 455/502 |
| 2006/0187909 | A1 * | 8/2006 | Sho et al. ...................... | 370/389 |
| 2009/0285319 | A1 * | 11/2009 | Zhang et al. .................. | 375/260 |
| 2010/0158046 | A1 * | 6/2010 | Pu ................................. | 370/474 |

* cited by examiner

*Primary Examiner* — Brian Roberts
(74) *Attorney, Agent, or Firm* — Mark J. Danielson; Pillsbury Winthrop Shaw Pittman LLP

(57) ABSTRACT

A multi-tone modem has a plurality of shared and discrete components forming a transmit path and a receive path configured to couple to a wired communication medium for packet based communication thereon. The transmit path includes components for forming a communication packet including a hybrid preamble portion and a data portion. The hybrid preamble portion integrates both synch and timing info for packet alignment together with header information for determining at least packet destination, thereby shortening packet length by avoiding a requirement of a distinct header portion. The receive path includes components operative in a time domain to detect, in a stream of digitized samples, a symbol alignment of a received communication packet based on synch and timing info in the hybrid preamble portion thereof and operative in a frequency domain to extract header information from the hybrid preamble.

17 Claims, 6 Drawing Sheets

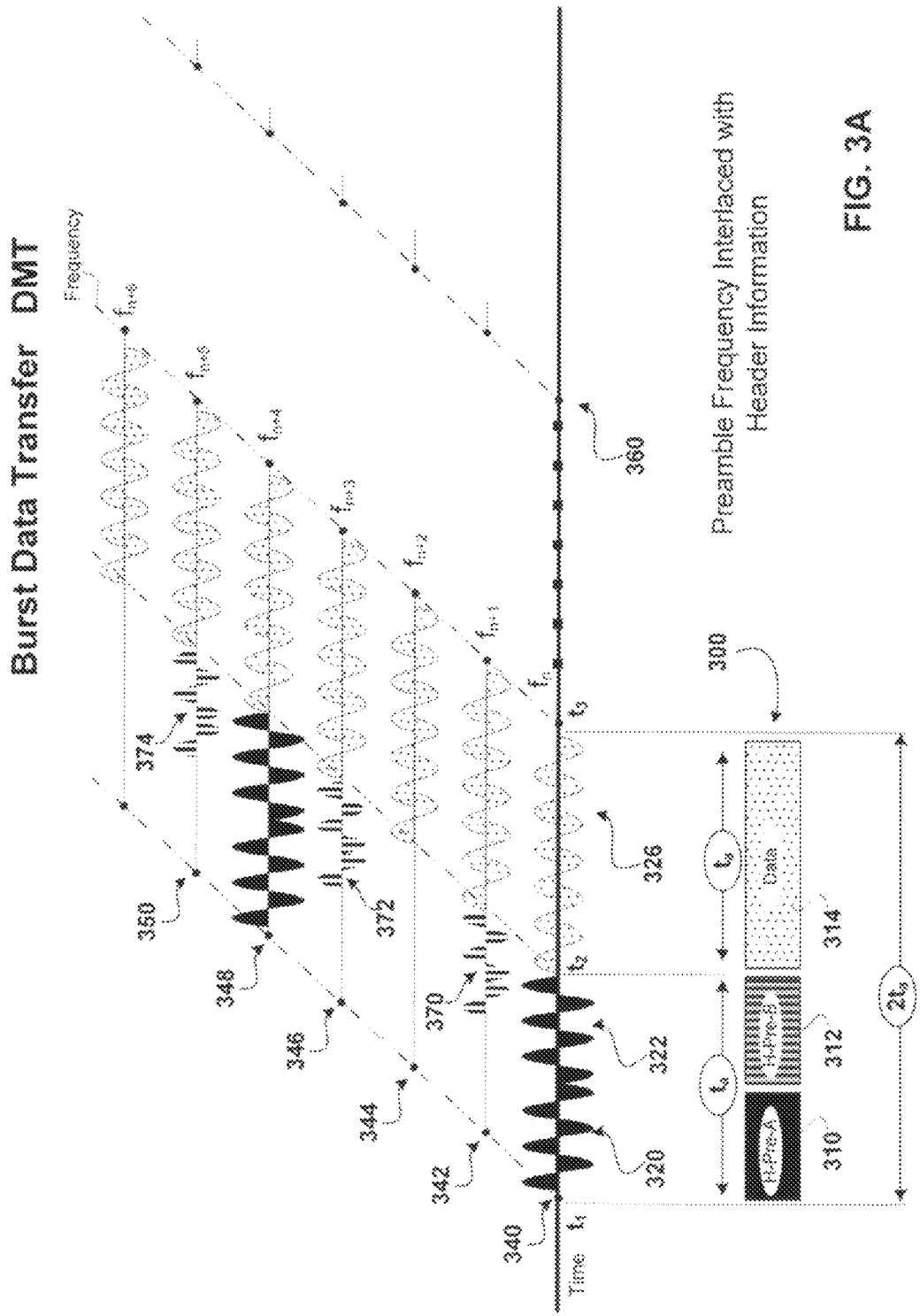

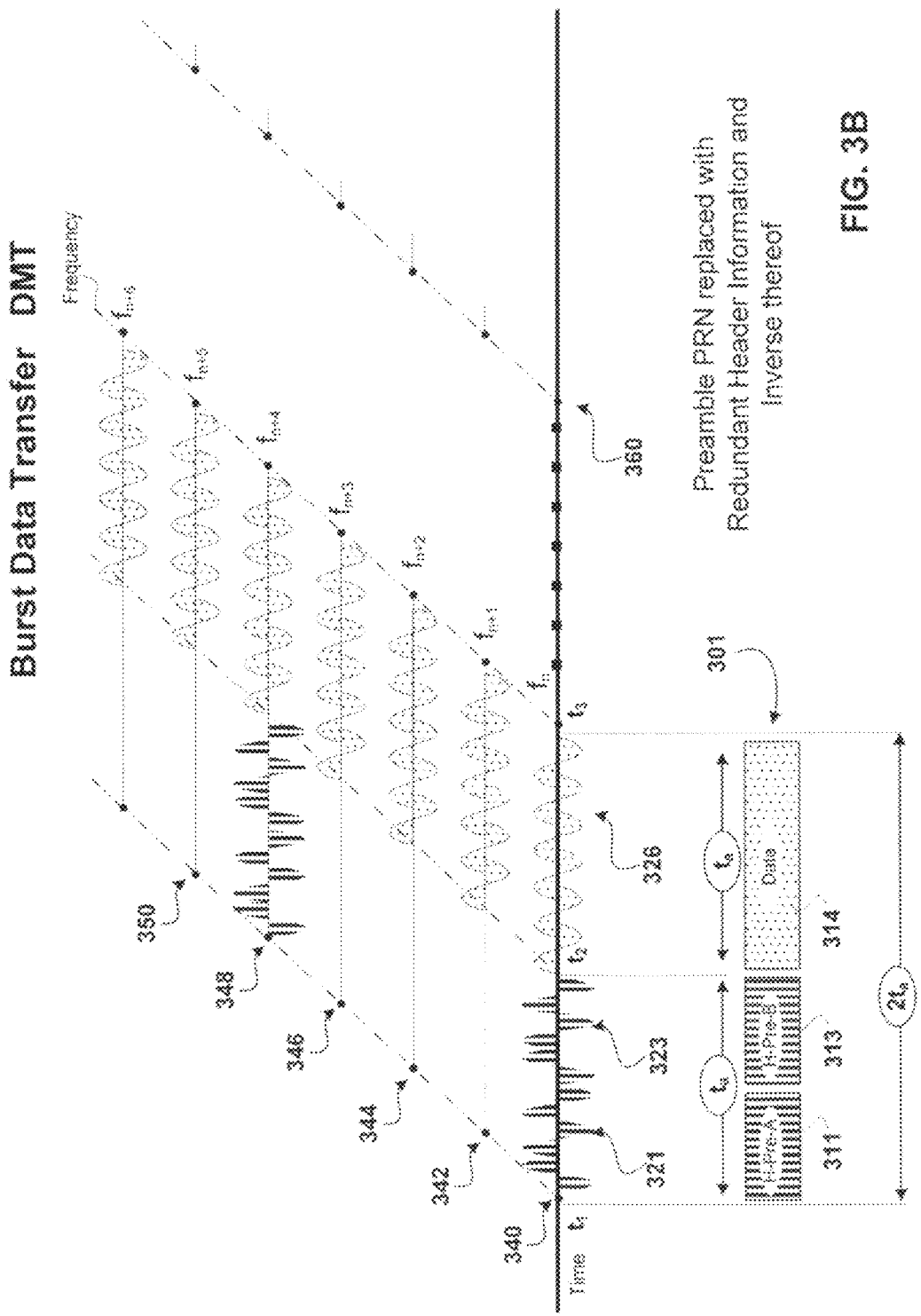

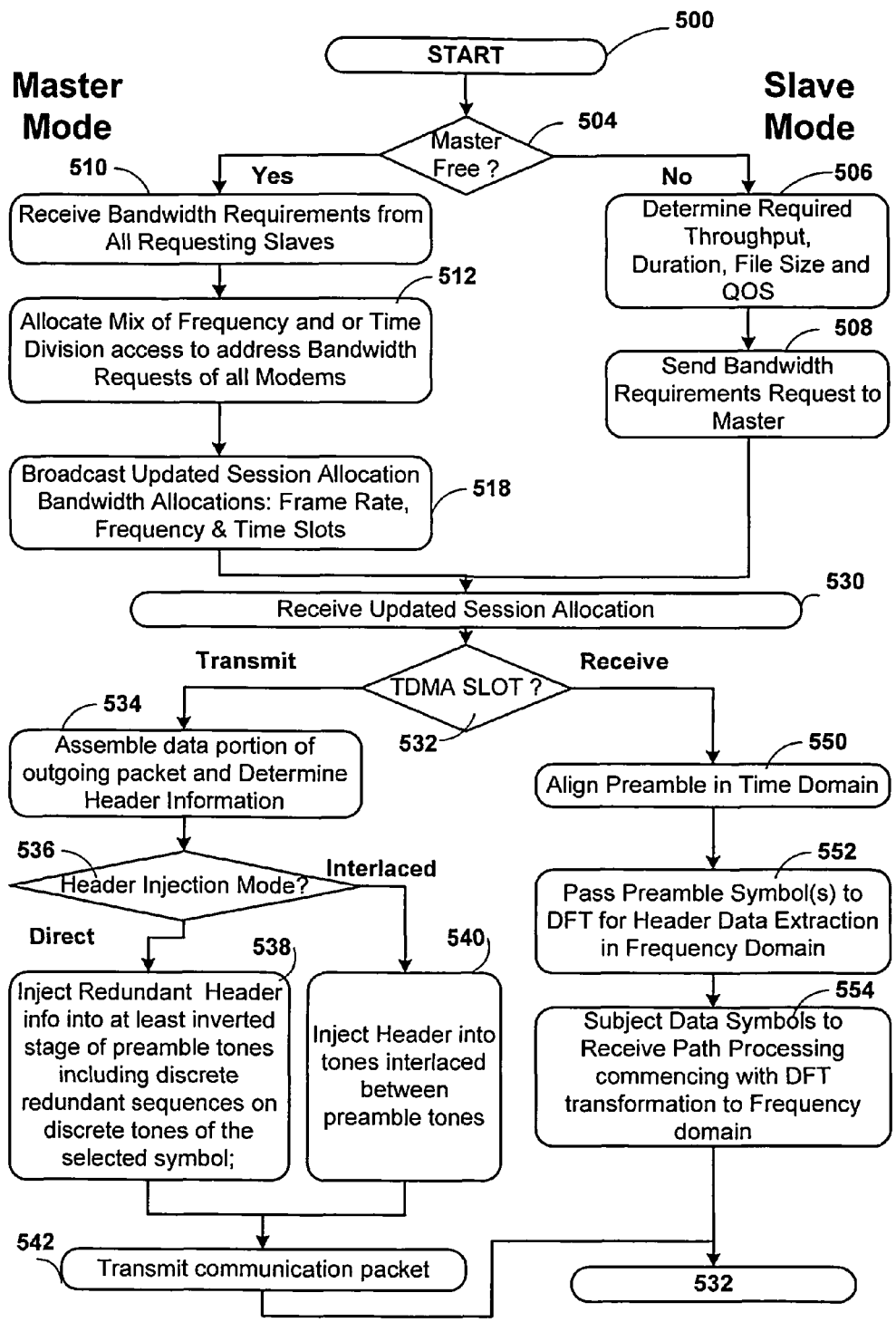
FIG. 5    Network Modem Burst Mode Processing

US 8,588,052 B1

METHOD AND APPARATUS FOR DMT NETWORK DATA TRANSFER

CROSS REFERENCE TO RELATED APPLICATION

This application claims the benefit of prior filed co-pending Provisional Applications: No. 61/103,201 filed on Oct. 6, 2008 entitled "Combined Preamble and Header for G.hn" which is incorporated herein by reference in its entirety as if fully set forth herein.

BACKGROUND OF THE INVENTION

1. Field of Invention

The field of the present invention relates to multi-tone transceivers.

2. Description of the Related Art

A range of technologies have been developed for providing broadband access to homes, apartments and offices. These technologies include: passive optical network (PON), cable, satellite and digital subscriber line (DSL). Each technology relies on a different communications medium, either wired, wireless or fiber for the transport of data to the building. Broadband access inside the building is distributed to TV's, computers, or other devices by a wired or wireless connection. Wired router connections to each TV or computer are typically provided by Ethernet cables strung through the building. Wireless router connections are made through base stations and receivers. Existing home and business distribution networks include: copper/aluminum wire for phone connections, existing cable connections for cable TV in various rooms, and existing copper/aluminum wire by which electricity is provided throughout all the rooms of the home. G.hn is the latest standard promulgated by the International Telecommunication Union (ITU) for home networking over: power lines, phone lines and coaxial cables with data rates up to 1 Gbit/s. The first recommendation is G.9960.

What is needed is a method and apparatus for improving the ease, security and coverage of broadband access provisioning to residential and business customers.

SUMMARY OF THE INVENTION

A method and apparatus is disclosed for a multi-tone modem configured to couple to a wire line communication medium. The modem may in an embodiment of the invention be used in combination with other like modems to provide network coverage over a shared wire line communication medium.

In an embodiment of the invention the multi-tone modem has a plurality of shared and discrete components forming a transmit path and a receive path configured to couple to a wired communication medium for packet based communication thereon. The transmit path includes components for forming a communication packet including a hybrid preamble portion and a data portion. The hybrid preamble portion integrates both synch and timing info for packet alignment together with header information for determining at least packet destination, thereby shortening packet length by avoiding a requirement of a distinct header portion. The receive path includes components operative in a time domain to detect, in a stream of digitized samples, a symbol alignment of a received communication packet based on synch and timing info in the hybrid preamble portion thereof and operative in a frequency domain to extract header information from the hybrid preamble.

Associated means and methods are also disclosed.

BRIEF DESCRIPTION OF THE DRAWINGS

These and other features and advantages of the present invention will become more apparent to those skilled in the art from the following detailed description in conjunction with the appended drawings in which:

FIGS. 3A-3B are graphs showing time and frequency assignments for successive symbol sets associated with alternate embodiments of the multi-tone modulated network communication packets of the current invention and the reduced overhead associated therewith as shown in FIG. 1;

FIG. 5 is a process flow diagram for the multi-tone modulated network modems shown in FIG. 1 in accordance with an embodiment of the invention.

DETAILED DESCRIPTION OF THE EMBODIMENTS

Figure 1:
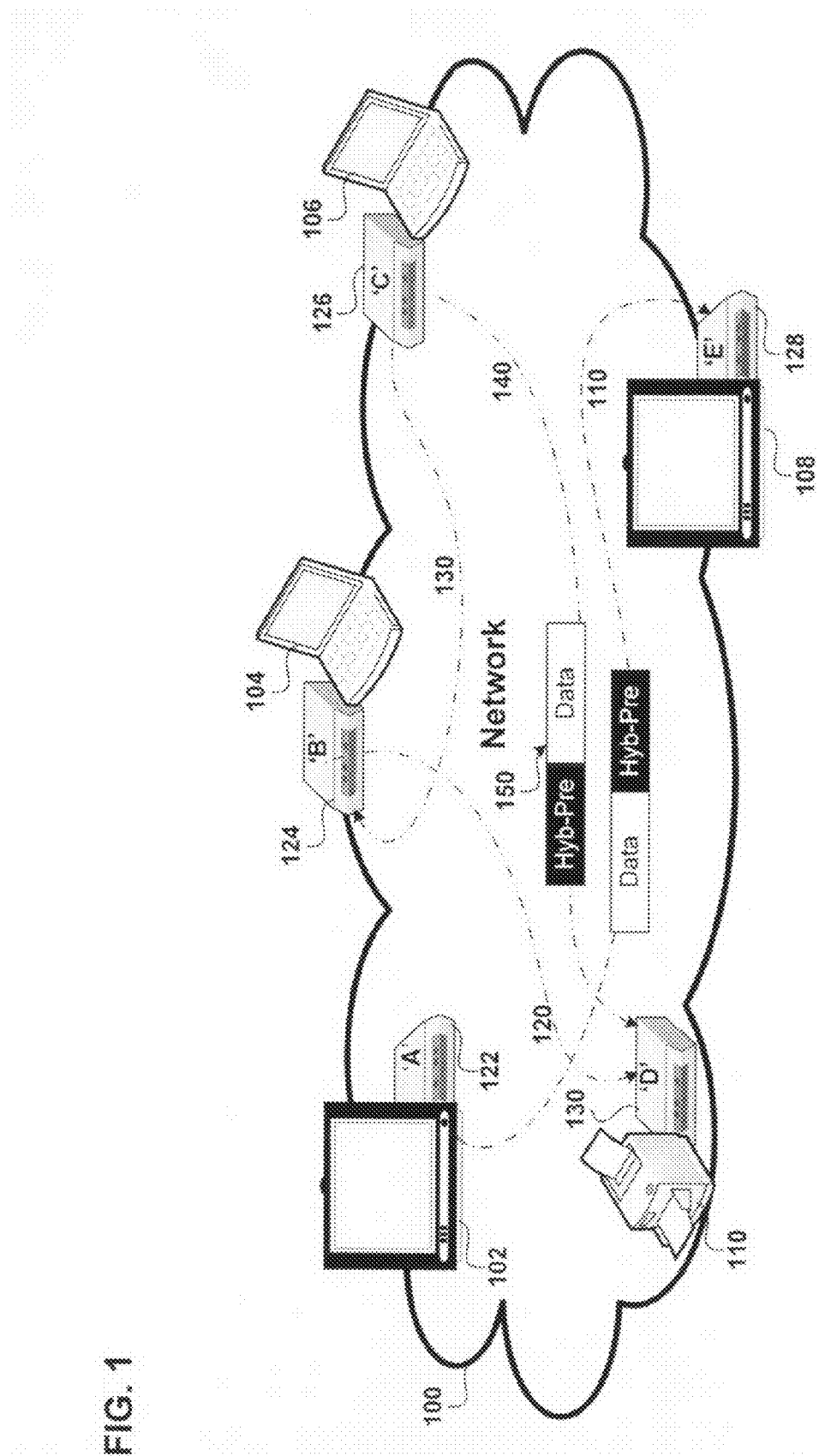
FIG. 1 is network diagram of discrete multi-tone (DMT) modulated modems coupled to one another via cable, phone line, or power lines, to form a network.

FIG. 1 is network diagram of discrete multi-tone (DMT) modulated modems coupled to one another via coaxial cable, phone line, or power lines, to form a packet based communication network 100. Modem 122 is shown coupling television 102 to the network. Modem 124 is shown coupling computer 104 to the network. Modem 126 is shown coupling computer 106 to the network. Modem 128 is shown coupling television 108 to the network. Modem 130 is shown coupling printer 110 to the network. Communication channels 110, 120, 130 and 140 are shown between various ones of the network modems. Network communications conventionally require a 3 part burst packet structure typically comprising: a preamble for packet identification and timing, a header for source, destination and length identification, and a data body. The packets generated by the multi-tone modems of the current invention, e.g. packet 150, are shorter in length than prior art network packets. Specifically, the packets of the current invention dispense with the discrete header portion of the packet structure thus reducing packet length by 15-25%. The hybrid preamble of the current invention, embodies the combined functionality of the discrete prior art header and preamble in a single data structure of reduced length. Reduced packet length, corresponds to reduced network overhead which translates into decreased latency and/or increased data transport capability for the network as a whole.

Figure 2:
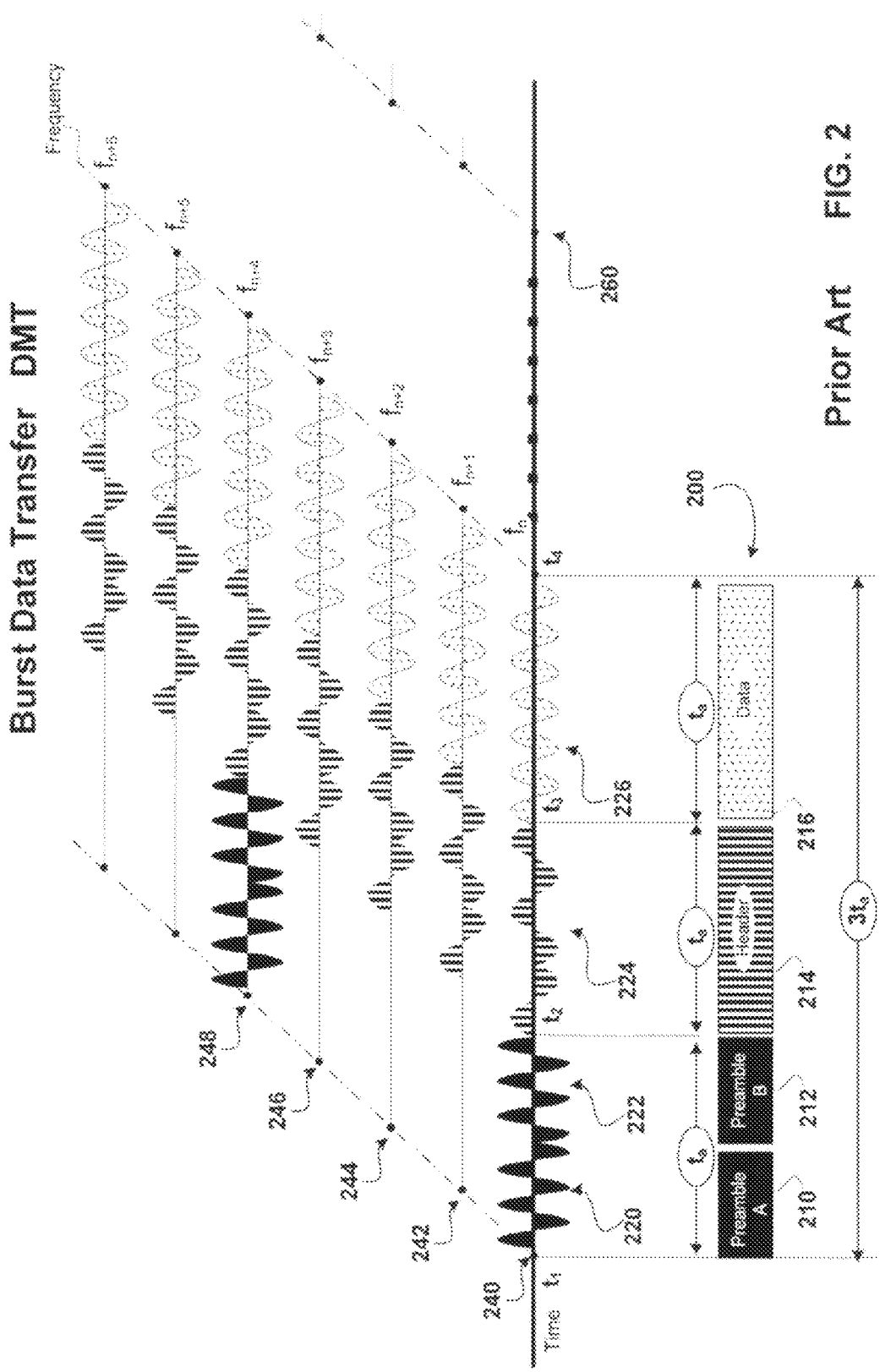
FIG. 2 is a graph showing time and frequency assignments for successive symbol sets associated with prior art multi-tone modulated network communication packets and overhead associated therewith.

FIG. 2 is a graph showing time and frequency assignments for successive symbol sets associated with prior art multi-tone modulated network communication packets and overhead associated therewith. Packet 200 comprises: a preamble with non-inverted and inverted portions 210-212 respectively, a header 214, and a data body 216. Preambles 210-212, header 214 and data body 216 each span equivalent time intervals, $t_a$. Thus the total packet length in units of time is $3t_a$.

The preamble allows receiving modems to detect and synchronize receive path processing of the successive symbols which make up the packet. The preamble typically comprises a redundant pseudo random number followed by a time domain inverse thereof, the simplistic structure of which enables the receiving modem to synchronize with the received packet. The header information portion which follows the preamble portion allows the receiving modem to identification packet configuration parameters including: device id of source modem, device id of receiving modem and packet length for example. The data body contains the data communicated from the transmitting modem in the subject packet.

Each communication packet, e.g. packet 200, is constructed from successive multi-tone modulated symbols with each symbol in turn including multiple modulated tones or sub-channels separated from one another in frequency. Representative tones, a.k.a. sub-channels, 240, 242, 244, 246, 248 are each shown with associated center frequencies, $f_n$, $f_{n+1}$, $f_{n+2}$, $f_{n+3}$, $f_{n+4}$ respectively.

The preamble is modulated on selected tones within each tone set, a.k.a. symbol. In FIG. 2 the preamble is modulated on tones 240 and 248 in several successive symbol intervals during which intervening tones, e.g. tones 242, 246, 246 are inactive. Additionally, the preamble may be modulated at a higher symbol rate than succeeding header and data body portions of the packet. This higher preamble symbol rate is represented by the relatively higher frequency non-inverted 220 and inverted 222 preamble waveforms shown on tone 240 in comparison to following portions of the packet, i.e. header information and data portions, the associated waveforms of which 224 and 226 respectively exhibit a relatively lower modulation frequency corresponding to lower associated symbol rates. The header and data body portions of the packet are modulated on all tones, e.g. tones 240-248 as shown in FIG. 2. The onset of a succeeding burst packet transfer 260 is also shown.

FIGS. 3A-3B are graphs showing time and frequency assignments for successive symbol sets associated with alternate embodiments of the multi-tone modulated network communication packets of the current invention and the reduced overhead associated therewith as shown in FIG. 1. The communications packets in both embodiments of the invention do not require a discrete header information portion and thus have a transmit length which in time units is approximately 33% less than that of their prior art counterpart. The header information is transmitted concurrently with the preamble, thereby avoiding the additional packet length associated with a discrete header information portion. The compact packet structure of this invention considerably decreases the overhead associated with packet based data transfer on the network.

In the embodiment of the invention shown in FIG. 3A compact packet structure is achieved by interlacing header information on a discrete set of tones distinct from and intermediate in frequency with respect to the selected the preamble tones. The representative communication packet 300 comprises: a preamble with a non-inverted portion 210 and an inverted portion 212. The inverted portion 212 is shown in vertical cross hatch to represent the fact that an intermediate set of tones distinct from the preamble tones is concurrently modulated with header information. The remaining portion of the packet is the data body 314. Preambles 310-312, and data body 314 each span equivalent time intervals, $t_a$. Thus the total packet length in units of time is $2t_a$ or approximately 33% smaller in duration than prior are packet structures.

Each communication packet, e.g. packet 300, is constructed from successive multi-tone modulated symbols with each symbol in turn including multiple modulated tones or sub-channels separated from one another in frequency. Representative tones, a.k.a. sub-channels, 340, 342, 344, 346, 348 are each shown with associated center frequencies, $f_n$, $f_{n+1}$, $f_{n+2}$, $f_{n+3}$, $f_{n+4}$ respectively.

The preamble is modulated on selected tones within each tone set, a.k.a. symbol, e.g. tones 240 and 248 in several successive symbol intervals. In this embodiment of the invention selected intervening tones, e.g. tones 342, 346, 350, with an 'odd' index number, are modulated with header information. The header information may be transmitted with multiple levels of redundancy depending on the particular embodiment of the invention. In one embodiment, header information on each selected intermediate tone is distinct from that modulated on each remaining selected intermediate tone, yet redundant with respect the successive symbols which comprise a given intermediate tone. In another embodiment of the invention header information modulated on each selected intermediate tone is not redundant with respect to succeeding symbol intervals in the same selected tone, but is redundant across remaining selected intermediate tones of each symbol set.

In the embodiment shown modulation of these distinct selected tones dedicated to header information occurs during the second, a.k.a. inverted, half of the preamble portion of the packet transmission. The waveforms 370, 372, 374 associated with header information modulation are shown on tones 342, 346, 350 respectively. In an alternate embodiment of the invention header information is modulated on selected intermediate tones during the entire preamble portion of the packet transmission.

Following the preamble portion of the packet, the data body portion shows modulation of all tones in each tone set or symbol interval, with the associated data. This higher preamble symbol rate is represented by the relatively higher frequency non-inverted 320 and inverted 322 preamble waveforms shown on tone 340 in comparison to following data portion of the packet the associated waveform 326 of which exhibits a relatively lower modulation frequency corresponding to lower associated symbol rate. The onset of a succeeding burst packet transfer 360 is also shown.

In the embodiment of the invention shown in FIG. 3B a compact packet structure is achieved by substituting redundant header information and the time domain inverse thereof, for the pseudo random number (PRN) associated with prior are preambles. The representative communication packet 301 comprises: a preamble with a non-inverted portion 311 and an inverted portion 313. Both portions of the preamble are shown in vertical cross hatch to represent the fact that the selected preamble tones are modulated during the first half of the preamble portion of the packet with redundant header information and during the second half of the preamble portion of the packet with a time domain waveform inverse of the first half. The remaining portion of the packet is the data body 314. Preambles 311-313, and data body 314 each span equivalent time intervals, $t_a$. Thus the total packet length in units of time is $2t_a$ or approximately 33% smaller in duration than prior are packet structures.

Each communication packet, e.g. packet 301, is constructed from successive multi-tone modulated symbols with each symbol in turn including multiple modulated tones or sub-channels separated from one another in frequency. Representative tones, a.k.a. sub-channels, 340, 342, 344, 346, 348 are each shown with associated center frequencies, $f_n$, $f_{n+1}$, $f_{n+2}$, $f_{n+3}$, $f_{n+4}$ respectively.

The preamble is modulated on selected tones within each tone set, a.k.a. symbol, e.g. tones 240 and 248, in several successive symbol intervals. In this embodiment of the invention intervening tones are inactive, since the preamble tones themselves are modulated with header information in a manner which retains the redundancy and inversion characteristics of a traditional preamble. The redundancy of the transmitted header information results from the tone loading algorithm implemented by the associated preamble generator, e.g. generator 420 in FIG. 4. The header information used to modulate the preamble tones, may exhibit multiple levels of redundancy depending on the particular embodiment of the invention. In one embodiment header information on each preamble tone is distinct from that modulated on each remaining preamble tone, yet redundant with respect the successive symbols which comprise a given preamble tone. In another embodiment of the invention header information modulated on each tone is not redundant with respect to succeeding symbol intervals in the same selected tone, but is redundant across remaining selected preamble tones of each symbol set. In both embodiments discussed immediately above, the second half of the preamble interval has a waveform which is the inverse of that resulting from the modulated header information during the first half of the preamble portion of the packet, thus allowing the receiving modem to identify and synchronize with the received packet.

Following the preamble portion of the packet, the data body portion shows modulation of all tones in each tone set or symbol interval, with the associated data. This higher preamble symbol rate is represented by the relatively higher frequency non-inverted 321 and inverted 323 preamble waveforms shown on tone 340 in comparison to following data portion of the packet the associated waveform 326 of which exhibits a relatively lower modulation frequency corresponding to lower associated symbol rate. The onset of a succeeding burst packet transfer 360 is also shown.

Figure 4:
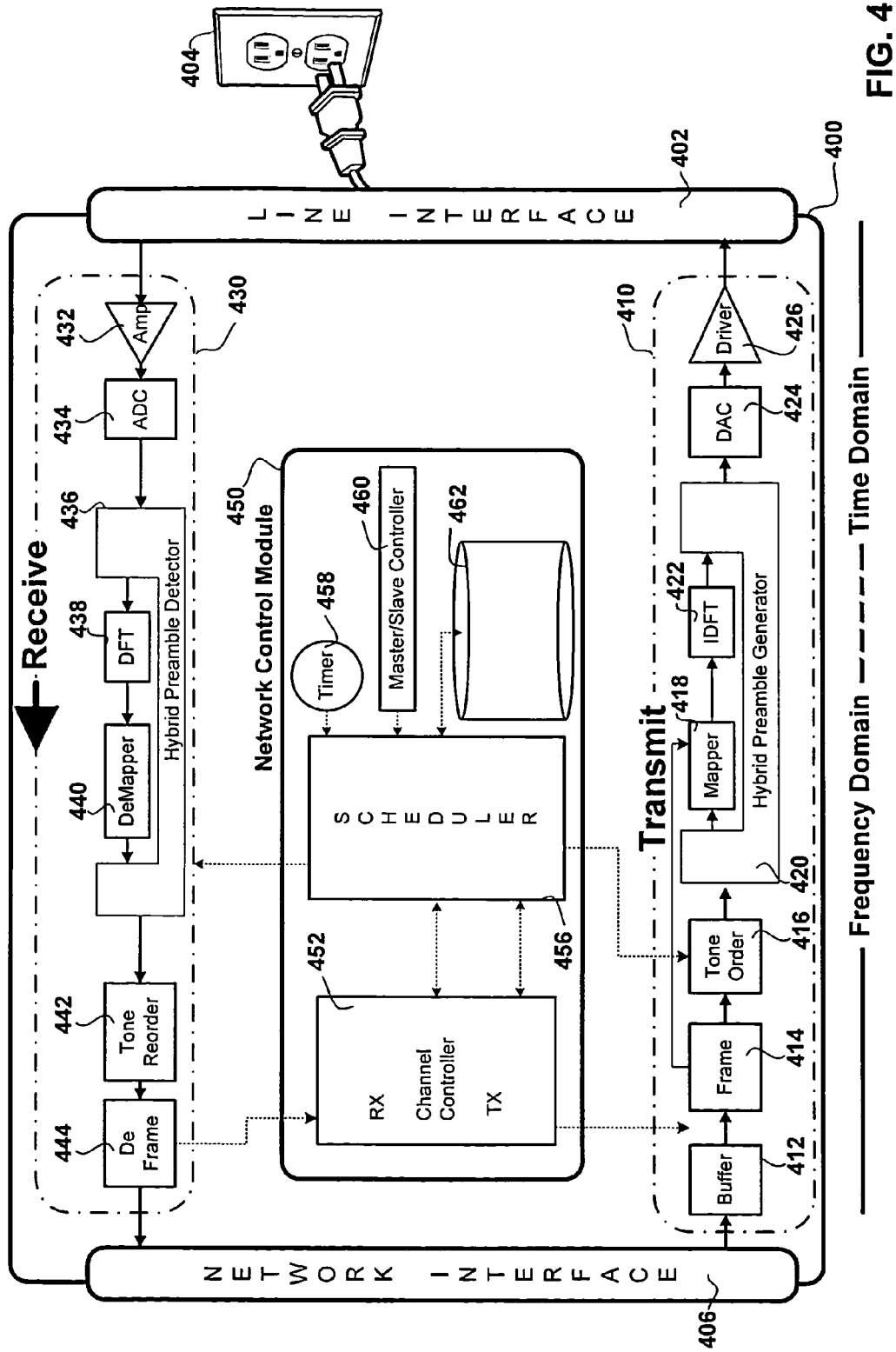
FIG. 4 is hardware block diagram of an embodiment of one of the multi-tone modulated network modems shown in FIG. 1.

FIG. 4 is hardware block diagram of an embodiment of one of the DMT modems shown in FIG. 1. The modem 400 includes both shared and discrete components coupled to one another to form a transmit path 410 and a receive path 430. The transmit and receive path couple at one end via line interface 402 to the shared communications medium, e.g. twisted wire pair, AC power line 404, or coaxial cable. The transmit and receive path couple at the opposing end via network interface 406 to an Ethernet or other packet based network appliance, Television, or other mixed or multi-media device.

The transmit and receive paths operate under the control of an optional network control module 450. The network control module includes: storage 462, master/slave controller 460, timer 458, scheduler 456 and channel controller 452.

The network control module and specifically the master/slave controller 460 thereof may support the automatic configuration of the modem into either the master or slave mode. Master or slave mode may be determined statically, e.g. by a switch, or dynamically based on the state of the network. Additionally, the network control module and specifically the scheduler component 456 thereof may support bandwidth allocation for the packet based communications on the network. Bandwidth allocation may in alternate embodiments of the invention be dynamic or static and may be implemented using either or both frequency division multiple access (FDMA) and or time division multiple access (TDMA). Each modem's network control module may include a timer 458 coupled to the scheduler to enable tracking a network schedule if propagated by the master one of the modems. The channel controller handles feedback between the receive and transmit path components. In an embodiment of the invention in which the network implements transmit and transmission receipt acknowledgement (ACK) protocols the channel controller blocks and or forces retransmission of a prior transmission depending on whether or not an ACK has been received.

The dedicated components of the transmit and receive paths support DMT modulation and demodulation of data. In an embodiment of the invention the transmit path includes: a buffer 412, a framer 414, a tone orderer 416, a constellation mapper 418, a hybrid preamble generator 420 operative in both the time and frequency domain, an inverse discrete Fourier transform (IDFT) component 422, a digital-to-analog (DAC) converter 424 and a line driver 426. The buffer stores transmitted data until an ACK is received. The framer frames one or more discrete channels of communication channel data into frames and calculates header information which it passes forward to the hybrid preamble generator 420. The tone orderer parses the bit stream onto associated tones, the mapper maps the allocated bits for each tone or sub-channel within each successive tone set, each of which corresponds to a symbol. The hybrid preamble generator is operative exclusively for generation of the preamble portion of each outgoing packet. During the assembly of the data portion of each packet the hybrid preamble generator is not involved. The hybrid preamble generator is operative in both the frequency and time domain during the assembly of the preamble portion of each packet. In the frequency domain the hybrid preamble generator takes the header information from the framer and orders it with any required redundancy required for injection into the tones dedicated to the header data within each successive symbol associated with the preamble. The header data is mapped by the mapper to the corresponding complex number representation onto the correct tone bin(s) shown in the embodiments of the invention corresponding to either FIG. 3A or FIG. 3B and then transformed into the time domain.

In the embodiment of the invention shown in FIG. 3A each symbol associated with the preamble includes not only the waveforms associated with the discrete tones 370, 372, 374 (See FIG. 3A) to transport of header data and available at the output of the IDFT but also the waveforms associated with the discrete selected preamble tones, e.g. tones 342 and 348 shown in FIG. 3A. These later waveforms can be precomputed from the associated pseudo random data (PRN) and added to the preamble symbols either by the frequency domain or the time domain portions of the hybrid preamble generator. In this embodiment of the invention the hybrid preamble generator adds a preamble to each outgoing communication in each allocated TDMA interval. Conversely, in the embodiment of the invention shown in FIG. 3B the hybrid preamble generator operates exclusively in the frequency domain to inject the redundant header data into the dedicated preamble tones.

The DAC converts the digital time domain data from the IDFT, for either the preamble or data body portions of the outgoing packet, to an analog signal for amplification onto the shared communication medium via the line driver.

In an embodiment of the invention the receive path includes: a low noise amplifier 432, an analog-to-digital (ADC) converter 434, a hybrid preamble detector 436, a discrete Fourier transform (DFT) module 438, a demapper 440, a tone reorderer 442, and a deframer 444. The received signal is amplified by the low noise amplifier and then converted from analog to digital by the ADC. The stream of digitized samples from the ADC's is analyzed by the time domain portion of the preamble detector including an autocorrelator portion thereof (not shown) which identifies the preamble portion of the received packet and the required offsets to synchronize receive path processing with the symbol boundaries therein. Unlike prior art preamble detectors which remove and discard the preamble, the hybrid preamble detector sends the preamble to the next component in the receive path, i.e. the DFT for further processing. The DFT transforms the received preamble from the time domain to the frequency domain. The DFT performs a single transform from the time domain to the frequency domain of each successive symbol of the preamble, and also the subsequent data portion of the received packet. The complex coefficients from the DFT are demapped in the demapper for each tone or sub-channel. The frequency domain portion of the hybrid preamble detector extracts the bits of the preamble associated with header information and passes it to subsequent receive path components including the network control module. If the header information indicates the received packet destination corresponds to the subject modem then processing of the received packet continues with any associated tone reordering in the tone re-orderer 442 after which the resultant bit stream of the received packet is deframed in the deframer 444 and passed to the corresponding TV, computer, or network attached peripheral to which the modem is coupled.

FIG. 5 is a process flow diagram for the multi-tone modulated network modems shown in FIG. 1 in accordance with an embodiment of the invention. In an embodiment of the invention the network control module in each multi-tone modem dynamically determines whether to configure the modem into either master or slave mode. After initialization in start block 500 control passes to decision process 504. In decision process 504 the modem determines the network status, i.e. whether or not there is an existing master on the network to which it is coupled. If the modem itself is master then there is no change in status and control passes to master processes commencing with process 510. If the modem itself is not master, then the modem determines whether the master portion of the control channel is active, indicating another modem in the network is currently the active master in which control passes to slave processes commencing with process 506. Alternately, if the modem is not master, and the master control channel is not active then control passes to the first of the master processes, i.e. process 510.

If another modem is currently master then the modem enters slave mode the initial step of which is to determine required throughput, duration and quality of service (QOS) in process 506. Next in process 508, the modem in slave mode sends the bandwidth requirements determined in the prior step to the master.

Alternately, if this modem is currently master or if no modem is currently master then the modem enters master mode the initial step of which is to become master of the network. Then in process 510 the modem in master mode receives the bandwidth requirements from all requesting slaves. Next in process 512 the network controller 450 (See FIG. 4) of the modem in master mode, may determine a mix of frequency and or time division multiplexing of modem-to-modem channels which meets the bandwidth or other requirements of all modems including the master and requesting slaves. In an embodiment of the invention dedicated frequency range(s) without time division multiplexing, are allocated to streaming media, e.g. video and audio, based on the relatively high data rates and QOS requirements of streaming media. Remaining portions of the frequency spectrum are sub-divided in either or both time and frequency to handle the access requirements of remaining links dedicated to intermittent file transfers such as computer-to-printer or computer-to-computer file transfer links. Next in process 718 the allocated channel a.k.a. session information, including bandwidth allocation, frame rate, frequency and time slots, is broadcast on to the other modems on the network.

After the last dedicated master step 518 or slave step 508 the modem, whether in master or slave mode, executes processes commencing with process 530. In process 530 the modem updates its channel, a.k.a. session, allocation to correspond with the determination made by the master in process 518.

Next in decision process 532 a determination is made as to whether subsequent processing involves a transmission interval, whether allocated on the basis of carrier sense multiple access (CSMA) and or time division multiple access (TDMA) or a receive interval. The first step 550 of receive processing involves aligning or synchronizing receive path processing with the detected preamble in the time domain. Next in process 552 the preamble symbols are passed to the DFT for header data extraction in the frequency domain. Next in process 554 the data portion of the received packet, and specifically each symbol thereof are subject to receive path processing commencing with the transformation from the time to the frequency domain of each symbol of received data by the DFT. Control subsequently return to decision process 532 for processing the next package.

Alternately, transmit processing commences in process 534. In process 534 the framer assembles the data portion of an outgoing packet and determines header information therefore, such as destination address and packet length. Next in decision process 536 a determination as to the hybrid preamble structure is made. If the structure interlaces preamble tones with header information tones with one another in frequency as shown in FIG. 3A then control passes to process 540. In process 540 header information is injected into a first set of tones dedicated to header data and preamble tones are injected with the associated redundant pseudo random sequence and time domain inverse thereof after which control passes to process 542 for transmission of the assembled communication packet. If, alternately, the preamble portion of the packet involves direct injection of header information with the required redundancy and inversion into the dedicated preamble tones then control passes to process 538. Subsequently control also passes to process 542 for transmission of the assembled packet. Control then returns to decision process 532 for processing the next packet.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A multi-tone modem comprising a plurality of shared and discrete components forming a transmit path and a receive path configured to couple to a wired communication medium for packet based communication thereon, and the shared and discrete components of the multi-tone modem comprising:

transmit path components for forming a communication packet including a hybrid preamble portion and a data portion, and the hybrid preamble portion integrating both synch and timing information for packet alignment together with header information for determining at least packet destination, thereby shortening packet length by avoiding a requirement of a distinct header portion; and receive path components operative in a time domain to detect, in a stream of digitized samples, a symbol alignment of a received communication packet based on synch and timing information in the hybrid preamble portion thereof and operative in a frequency domain to extract header information from the hybrid preamble.

2. The multi-tone modem of claim 1, wherein the receive path components further comprise:

a time domain preamble detector operative in the time domain for detecting, in the stream of digitized samples, the symbol alignment of the received communication packet based on synch and timing information in the hybrid preamble portion thereof;

a Fourier transform component for transforming the hybrid preamble portion detected by the time domain preamble detector between the time domain and a frequency domain; and a frequency domain preamble detector operative in the frequency domain for extracting header information from the hybrid preamble transformed by the Fourier transform component.

3. The multi-tone modem of claim 1, wherein the hybrid preamble portion of each communication packet includes successive multi-tone modulated symbols with each symbol comprising a plurality of sub-channels identified as tones, and selected ones of the successive multi-tone modulated symbols including both a set of preamble tones interlaced in frequency together with a discrete set of header tones; and the set of preamble tones modulated with redundant pseudo-random data and exhibiting in the time domain a redundant waveform followed by an inversion of the redundant waveform; and the set of header tones modulated with header information including at least one of: packet source address; packet destination address; and packet length.

4. The multi-tone modem of claim 1, wherein the hybrid preamble portion of each communication packet includes successive multi-tone modulated symbols with each symbol comprising a plurality of sub-channels identified as tones, and the multi-tone modulated symbol including a set of preamble tones separated in frequency from one another and the preamble tones of a first set of the successive symbols modulated with redundant header information including at least one of: packet source address; packet destination address; and packet length and the preamble tones of a second set of the successive symbols modulated with a time domain inverse of the redundant header information of the first set of successive symbols.

5. The multi-tone modem of claim 1, wherein the wired communication medium comprises at least one of: a phone line, a power line and a coaxial cable.

6. A method for communication on a multi-tone modulated wire line network; comprising:

transmitting onto the wire line network successive multi-tone modulated symbols associated with a communication packet having a hybrid preamble portion and a data portion, and the hybrid preamble portion of the communication packet integrating both synch and timing information for packet alignment together with header information for identifying a network destination of the communication packet, thereby shortening communication packet length by avoiding a requirement of a distinct header portion thereof;

receiving a stream of digitized samples including the communication packet transmitted in the transmitting act;

detecting in a time domain in the stream of digitized samples a symbol alignment of a received communication packet based on synch and timing information in the hybrid preamble portion thereof; and extracting in a frequency domain, header information from the hybrid preamble portion of the communication packet detected in the time domain.

7. The method for communication of claim 6, further comprising the act intermediate the detecting and extracting acts of:

transforming the hybrid preamble portion detected in the detecting act between the time domain and a frequency domain.

8. The method for communication of claim 6, wherein the transmitting act further comprises the acts of:

forming the hybrid preamble portion of each communication packet from successive multi-tone modulated symbols with each symbol comprising a plurality of sub-channels identified as tones; and modulating within selected ones of the successive multi-tone modulated symbols both a set of preamble tones interlaced in frequency together with a discrete set of header tones; and the set of preamble tones modulated with redundant pseudorandom data and exhibiting in the time domain a redundant waveform followed by an inversion of the redundant waveform; and the set of header tones modulated with header information including at least one of: packet source address: packet destination address: and packet length.

9. The method for communication of claim 6, wherein the transmitting act further comprises:

forming the hybrid preamble portion of each communication packet from successive multi-tone modulated symbols with each symbol comprising a plurality of sub-channels identified as tones; and modulating selected preamble tones within each of the multi-tone modulated symbols, and the preamble tones separated in frequency from one another and the preamble tones of a first set of the successive symbols modulated with redundant header information including at least one of: packet source address; packet destination address; and packet length and the preamble tones of a second set of the successive symbols modulated with a time domain inverse of the redundant header information of the first set of successive symbols.

10. The method for communication of claim 6, wherein the wire line network comprises at least one of: a phone line, a power line and a coaxial cable.

11. A means for communication on a multi-tone modulated wire line network; comprising:

means for transmitting onto the wire line network successive multi-tone modulated symbols associated with a communication packet having a hybrid preamble portion and a data portion, and the hybrid preamble portion of the communication packet integrating both synch and timing information for packet alignment together with header information for identifying a network destination of the communication packet, thereby shortening communication packet length by avoiding a requirement of a distinct header portion thereof: and means for receiving a stream of digitized samples including the communication packet transmitted by the means for transmitting;

means for detecting in a time domain in the stream of digitized samples a symbol alignment of a received communication packet based on synch and timing information in the hybrid preamble portion thereof; and means for extracting in a frequency domain, header information from the hybrid preamble portion of the communication packet detected in the time domain.

12. The means for communication of claim 11, further comprising, intermediate the detecting and extracting means:
  means for transforming the hybrid preamble portion detected by the detecting means between the time domain and a frequency domain.

13. The means for communication of claim 11, wherein the means for transmitting further comprises:
  means for forming the hybrid preamble portion of each communication packet from successive multi-tone modulated symbols with each symbol comprising a plurality of sub-channels identified as tones; and
  means for modulating within selected ones of the successive multi-tone modulated symbols both a set of preamble tones interlaced in frequency together with a discrete set of header tones; and the set of preamble tones modulated with redundant pseudo-random data and exhibiting in the time domain a redundant waveform followed by an inversion of the redundant waveform; and the set of header tones modulated with header information including at least one of: packet source address; packet destination address; and packet length.

14. The means for communication of claim 11, wherein the means for transmitting further comprises:
  means for forming the hybrid preamble portion of each communication packet from successive multi-tone modulated symbols with each symbol comprising a plurality of sub-channels identified as tones; and
  means for modulating selected preamble tones within each of the multi-tone modulated symbols, and the preamble tones separated in frequency from one another and the preamble tones of a first set of the successive symbols modulated with redundant header information including at least one of: packet source address; packet destination address; and packet length and the preamble tones of a second set of the successive symbols modulated with a time domain inverse of the redundant header information of the first set of successive symbols.

15. The means for communication of claim 11, wherein the multi-tone modulated wire-line network comprises at least one of: a phone line, a power line and a coaxial cable.

16. A method for communication on a multi-tone modulated wire line network comprising:
  receiving, in a first device coupled to the multi-tone modulated wire line network, a stream of digitized samples of a communication packet via successive multi-tone modulated symbols associated with the communication packet, the communication packet having a hybrid preamble portion and a data portion, and the hybrid preamble portion of the communication packet integrating both synch and timing information for packet alignment together with header information for identifying a network destination of the communication packet, thereby shortening communication packet length by avoiding a requirement of a distinct header portion thereof;
  detecting in the stream of digitized samples a symbol alignment of a received communication packet based on synch and timing information in the hybrid preamble portion thereof;
  extracting header information from the hybrid preamble portion of the communication packet; and
  transmitting the communication packet from a second device coupled to the multi-tone modulated wire-line network, wherein transmitting further comprises:
    forming the hybrid preamble portion of the communication packet; and
    simultaneously modulating, using data from the formed hybrid preamble portion, both a set of preamble tones interlaced in frequency together with a discrete set of header tones, the set of preamble tones modulated with redundant pseudorandom data, and the set of header tones modulated with header information including at least one of packet source address, packet destination address, and packet length.

17. A method for communication on a multi-tone modulated wire line network comprising:
  receiving, in a first device coupled to the multi-tone modulated wire line network, a stream of digitized samples of a communication packet via successive multi-tone modulated symbols associated with the communication packet, the communication packet having a hybrid preamble portion and a data portion, and the hybrid portion of the communication packet integrating both synch and timing information for packet alignment together with header information for identifying a network destination of the communication packet, thereby shortening communication packet length by avoiding a requirement of a distinct header portion thereof;
  detecting in the stream of digitized samples a symbol alignment of a received communication packet based on synch and timing information in the hybrid preamble portion thereof;
  extracting header information from the hybrid preamble portion of the communication packet; and
  transmitting the communication packet from a second device coupled to the multi-tone modulated wire-line network, wherein transmitting further comprises:
    forming the hybrid preamble portion of the communication packet; and
    modulating selected preamble tones with data from the formed hybrid preamble portion, the preamble tones separated in frequency from one another, the preamble tones in a first set of successive symbols being modulated with redundant header information including at least one of packet source address, packet destination address, and packet length, and the preamble tones of a second set of successive symbols being modulated with a time domain inverse of the redundant header information of the first set of successive symbols.

* * * * *

UNITED STATES PATENT AND TRADEMARK OFFICE
CERTIFICATE OF CORRECTION

PATENT NO. : 8,588,052 B1  
APPLICATION NO. : 12/587448  
DATED : November 19, 2013  
INVENTOR(S) : Schelstraete Page 1 of 1

It is certified that error appears in the above-identified patent and that said Letters Patent is hereby corrected as shown below:

In the Specification

In Column 3, Line 21, delete "tones 242, 246, 246" and insert -- tones 242, 244, 246 --, therefor.

In Column 3, Line 55, delete "portion 210" and insert -- portion 310 --, therefor.

In Column 3, Line 56, delete "inverted portion 212. The inverted portion 212" and insert -- inverted portion 312. The inverted portion 312 --, therefor.

In the Claims:

In Column 10, Line 57, in Claim 11, delete "thereof:" and insert -- thereof; --, therefor.

Signed and Sealed this  
Eleventh Day of February, 2014

Michelle K. Lee  
*Deputy Director of the United States Patent and Trademark Office*